(12) United States Patent
Verhaeven et al.

(10) Patent No.: US 9,647,467 B2
(45) Date of Patent: May 9, 2017

(54) SYSTEM AND METHOD FOR BALANCING ENERGY STORAGE DEVICES

(75) Inventors: Eric Verhaeven, Kasterlee (BE); Jeroen Van Den Keybus, Kessel-Lo (BE); Rudolf Vidael, Leuven (BE); Johan Coosemans, Wilsele (BE)

(73) Assignee: 4ESYS NV, Leuven (BE)

( * ) Notice: Subject to any disclaimer, the term of this patent is extended or adjusted under 35 U.S.C. 154(b) by 727 days.

(21) Appl. No.: 13/502,256

(22) PCT Filed: Oct. 19, 2010

(86) PCT No.: PCT/EP2010/065705
§ 371 (c)(1),
(2), (4) Date: May 5, 2012

(87) PCT Pub. No.: WO2011/048087
PCT Pub. Date: Apr. 28, 2011

(65) Prior Publication Data
US 2012/0235494 A1    Sep. 20, 2012

(30) Foreign Application Priority Data

Oct. 19, 2009 (EP) .................................. 09173418

(51) Int. Cl.
*H02J 1/00* (2006.01)
*H02J 7/00* (2006.01)

(52) U.S. Cl.
CPC ......... *H02J 7/0016* (2013.01); *Y02T 10/7055* (2013.01); *Y10T 307/685* (2015.04)

(58) Field of Classification Search
CPC ...... H02J 7/0016; H02J 7/0018; H02J 7/0054; H02J 2007/0059; H02M 3/158
See application file for complete search history.

(56) References Cited

U.S. PATENT DOCUMENTS 5,710,504 A * 1/1998 Pascual ................. H02J 7/0018
                                                                180/65.8
5,814,970 A    9/1998 Schmidt
(Continued)

FOREIGN PATENT DOCUMENTS

DE    19708842    9/1998
DE    10101542    4/2002
(Continued)

OTHER PUBLICATIONS

International Search Report for PCT/EP2010/065705, Completed by the European Patent Office on Dec. 6, 2010, 2 Pages.
(Continued)

*Primary Examiner* — Hal Kaplan
*Assistant Examiner* — Elim Ortiz
(74) *Attorney, Agent, or Firm* — Levy & Grandinetti (57) ABSTRACT

A system for balancing a series connection of energy storage devices having: an intermediate storage element coupled between a pair of sections of one or a number of adjacent energy storage devices of a series connection of energy storage devices, sections each having a more positive terminal (A) at one end and a more negative terminal (B) at its other end; and a switching device for switching sequentially between coupling terminals (A) to each other via intermediate storage element and coupling terminals (B) to each other via intermediate storage element wherein the sections are non-adjacent. A method for balancing a series connection between energy storage devices is also disclosed.

16 Claims, 6 Drawing Sheets

(56) References Cited

U.S. PATENT DOCUMENTS

| | | | |
|---|---|---|---|
| 5,932,932 A * | 8/1999 | Agatsuma | B60K 6/48 307/10.6 |
| 6,031,355 A * | 2/2000 | Rich | H01M 10/0445 320/117 |
| 6,064,178 A | 5/2000 | Miller | |
| 6,121,751 A | 9/2000 | Merritt | |
| 6,140,799 A * | 10/2000 | Thomasson | H01M 10/441 320/117 |
| 6,268,710 B1 | 7/2001 | Koga | |
| 6,281,662 B1 * | 8/2001 | Flohr | H02J 7/0054 320/139 |
| 6,404,165 B1 | 6/2002 | Shinpo et al. | |
| 6,624,612 B1 | 9/2003 | Lundquist | |
| 6,642,692 B2 | 11/2003 | Kinosgita | |
| 6,803,766 B2 | 10/2004 | Kobayashi et al. | |
| 7,078,908 B2 | 7/2006 | Fujita et al. | |
| 7,288,919 B2 | 10/2007 | Morita | |
| 7,312,596 B2 | 12/2007 | Bolz et al. | |
| 7,367,302 B2 | 5/2008 | Bolz et al. | |
| 7,615,966 B2 * | 11/2009 | Houldsworth | H02J 7/0016 320/118 |
| 8,310,204 B2 * | 11/2012 | Lee | H02J 7/0016 320/118 |
| 8,570,047 B1 * | 10/2013 | Davies | H01M 10/4207 307/17 |
| 2002/0074985 A1 | 6/2002 | Matsui et al. | |
| 2003/0139888 A1 | 7/2003 | Burns | |
| 2004/0051534 A1 | 3/2004 | Kobayashi et al. | |
| 2004/0113586 A1 | 6/2004 | Chen | |
| 2004/0246635 A1 * | 12/2004 | Morita | H02J 7/0018 361/1 |
| 2006/0139063 A1 | 6/2006 | Yano et al. | |
| 2009/0140694 A1 | 6/2009 | Zeng et al. | |
| 2010/0237830 A1 * | 9/2010 | Castelaz | H02J 7/0019 320/118 |
| 2012/0086390 A1 * | 4/2012 | Lim | H02J 7/0019 320/107 |
| 2012/0299545 A1 * | 11/2012 | Kuraishi | H02J 7/0055 320/112 |
| 2012/0306449 A1 * | 12/2012 | Tagami | H02J 7/0024 320/118 |
| 2013/0002201 A1 * | 1/2013 | Bodkin | H02J 7/0016 320/118 |
| 2014/0015474 A1 * | 1/2014 | Tsai | H02J 7/0042 320/103 |
| 2014/0042815 A1 * | 2/2014 | Maksimovic | H02J 1/00 307/63 |
| 2014/0049224 A1 * | 2/2014 | Hua | H02J 7/0068 320/136 |
| 2014/0340022 A1 * | 11/2014 | Kang | H02J 7/0014 320/103 |

FOREIGN PATENT DOCUMENTS

| | | |
|---|---|---|
| DE | 10150376 | 4/2003 |
| EP | 0432640 | 6/1991 |
| EP | 0992811 | 4/2000 |
| EP | 1083646 | 3/2001 |
| GB | 2293059 | 3/1996 |
| WO | 9744877 | 11/1997 |
| WO | 9815047 | 4/1998 |
| WO | 0122554 | 3/2001 |
| WO | 03032464 | 4/2003 |
| WO | 2004034543 | 4/2004 |
| WO | 2004049540 | 6/2004 |
| WO | 2005074092 | 8/2005 |
| WO | 2008045426 | 4/2008 |
| WO | 2008138958 | 11/2008 |
| WO | 2009041180 | 4/2009 |

OTHER PUBLICATIONS

Ruddell, A.J. et al., "Analysis of battery current microcycles in autonomous renewable energy systems," 112(2) J. Power Sources 531-46 (2002).

* cited by examiner

SYSTEM AND METHOD FOR BALANCING ENERGY STORAGE DEVICES

CROSS-REFERENCE TO RELATED APPLICATION

This application is the U.S. national phase of PCT Appln. No. PCT/EP2010/065705 filed on Oct. 19, 2010, which claims priority to EP Patent Application No. 09173418.6 filed on Oct. 19, 2009, the disclosures of which are incorporated in their entirety by reference herein.

FIELD OF THE INVENTION

The present invention relates to a method and system for balancing energy storage devices, more specifically a series connection of energy storage devices. Further, it relates to an assembly comprising a series connection of energy storage devices and such balancing system. Additionally, the invention relates to the use of such system or method for balancing a series connection of electric double-layer capacitors, lithium capacitors, electrochemical battery devices and battery packs, and lithium battery devices like lithium-polymer and lithium-ion battery devices.

BACKGROUND OF THE INVENTION

Recently, a lot of effort has been put in enhancing the use of energy storage media, in particular large numbers of energy storage devices in series connection. Such series connection is for example used in hybrid drive trains for buses, waste collection vehicles, fork lift trucks and electric cars.

Usually, a series connection of energy storage devices for medium and high voltage applications comprises a large number of energy storage devices. For example, since the maximum voltage of an energy storage device is limited to for example about 2.5V to 3.0V in case of a double layer capacitor, a number in the range of 20 to 25 energy storage devices need to be serially connected to form an energy storage device stack delivering a voltage of for example 60V.

A general problem of series connections of energy storing devices is that varying characteristics of each individual energy storage device due to, for example, differences in self-discharge, capacitance, internal resistance and temperature, generates an inequality between the individual energy storage devices resulting into a so-called unbalanced stack, resulting in poorly utilized energy storage device, unless a charge equalization is performed.

In order to solve the above problem, systems for balancing a series connection of energy storage devices are developed.

The most widely used systems are shunting charge of energy storage devices using a dissipative element, such as a resistor. This is a simple but very energy inefficient approach with the major drawback that balancing needs to be kept at very slow rates to alleviate relatively high heat dissipation.

An approach that is much more energy efficient and consequently can be operated at increased speed is shuttling of charge between the energy storage devices. This can be done by using intermediate energy storage elements such as capacitive or inductive elements.

For example, WO97/44877 describes a switched capacitor system for automatic battery equalization of series coupled batteries. The system includes for each pair of batteries a capacitor and a plurality of switching elements. Each of the capacitors is switched back and forth between a predetermined pair of batteries for the purpose of transferring charge and equalizing the output voltages of each of the batteries in the pair.

A major disadvantage of the above system is that the energy charge is always to be distributed through the series connection via adjacent devices. In other words, balancing large numbers of energy storage devices may take a significant amount of time, and this amount of time increases upon extending the number of energy storage devices.

In an attempt to solve the above problem, U.S. Pat. No. 6,404,165 describes a system, wherein a capacitor is connectable in parallel with at least two energy storage devices and wherein voltage monitoring means are used to monitor respective voltages of the energy storage devices and selecting two devices to be balanced to each other.

An obvious disadvantage of this prior art system is that voltage measurement for each individual energy storage device is used for balancing each individual energy storage device. Such system is technically complicated and consequently generates high manufacturing and implementation costs.

Figure 1:
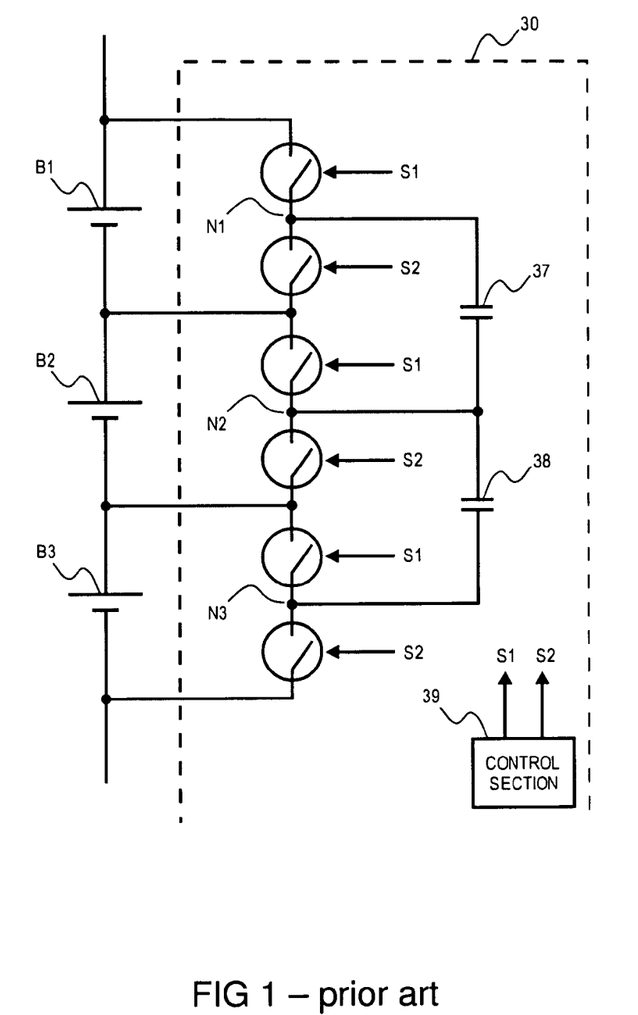
FIG. 1 illustrates an example of a prior-art system.
Figure 2A:
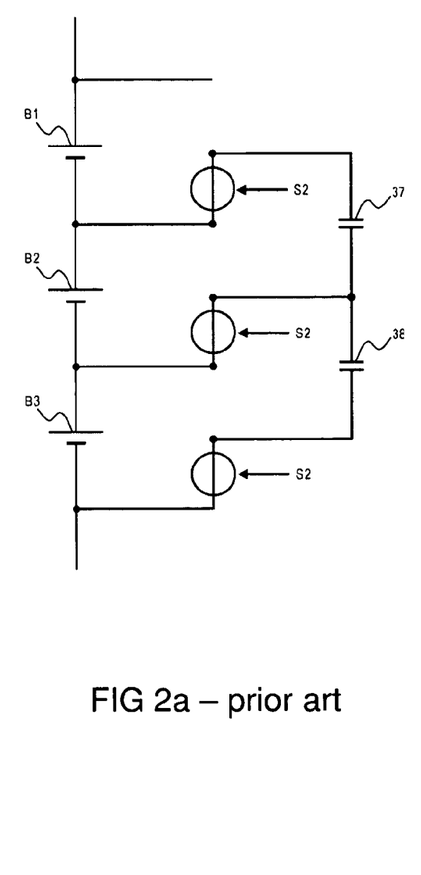
FIG. 2a en 2b illustrates an example of a prior-art method.
Figure 2B:
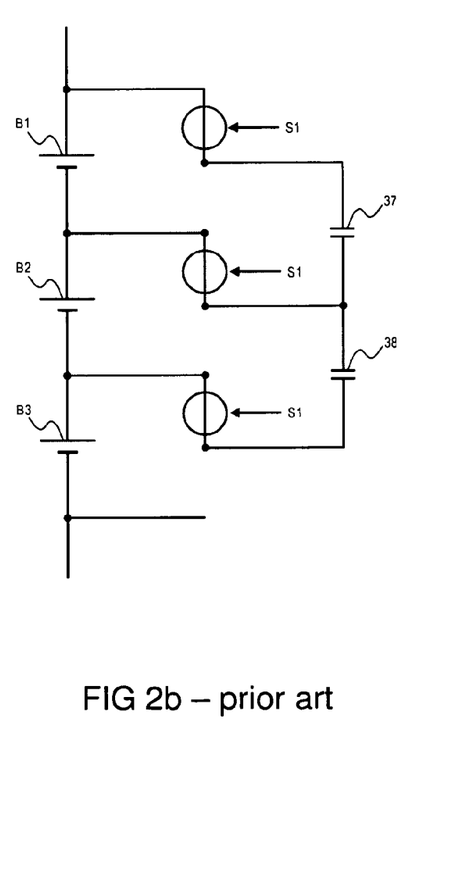

Another example of such prior art system is described in US2004/0246635 and illustrated in FIG. 1, FIG. 2a and FIG. 2b, wherein switch series S1 and S2 are switched alternatingly, placing the capacitors (37) and (38) subsequently in parallel to (B1) and (B2), and (B2) and (B3) respectively.

A major disadvantage of this method is its inability to efficiently redistribute charge between non-adjacent energy storage devices in a series connection. All such charge redistribution requires multiple, sequential transfer operations making the process slow and lossy.

Considering the above, it is an object of the present invention to provide a system and method for balancing a series connection of energy storage devices with an improved efficiency and less time consuming balancing, even upon extending the series connection to large numbers of energy storage devices or in case of heavy-duty applications requiring repetitive alternating energy delivery and storage in rapid succession.

Further, it is an object of the present invention to provide a system for balancing a series connection of energy storage devices with a simplified structure while allowing automatically controlled balancing which can be activated and deactivated at any time.

Another object of the present invention is to provide a low-cost system and method for balancing a series connection of energy storage devices, which is easily scalable to large numbers of energy storage devices.

A further object of the present invention is to provide a system and method for balancing a series connection of energy storage devices, which is easily scalable to different types of energy storage devices.

The invention meets the above objects by providing a system and method wherein an intermediate storage element is coupled between a pair of non-adjacent sections of one or a number of adjacent energy storage devices and wherein sequentially is switched between coupling the more positive terminals (A) of the pair of non-adjacent sections to each other via said intermediate storage element and coupling the more negative terminals (B) to each other via said intermediate storage element.

SUMMARY OF THE INVENTION

The invention is directed to a system for balancing a series connection of energy storage devices comprising:

a) an intermediate storage element coupled between a pair of sections of one or a number of adjacent energy storage devices of a series connection of energy storage devices, said sections each having a more positive terminal (A) at one end and a more negative terminal (B) at its other end;

b) and a switching means switching sequentially between coupling terminals (A) to each other via said intermediate storage element and coupling terminals (B) to each other via said intermediate storage element;

characterized in that said sections are non-adjacent.

Further, the invention is directed to an assembly comprising a series connection of energy storage devices and such balancing system.

Additionally, the invention is directed to a method for balancing a series connection of energy storage devices comprising the steps of:

a. providing a series connection of energy storage devices, b. selecting from said series connection a pair of sections of one or a number of adjacent energy storage devices, said sections to be balanced to each other and each having a more positive terminal (A) at one end and a more negative terminal (B) at its other end, c. coupling the terminals (A) of said pair of sections via an intermediate storage element, d. decoupling the terminals (A) and coupling the terminals (B) of said pair of sections via said intermediate storage element, e. sequentially repeating step c and d, characterized in that said sections are non-adjacent.

The invention is also directed to the use of the above system or method for balancing a series connection of electric double-layer capacitors, lithium capacitors, electrochemical battery devices and battery packs, and lithium battery devices like lithium-polymer and lithium-ion battery devices.

DESCRIPTION OF THE INVENTION

The present invention is based on intermediate energy storage regulation, because this approach offers the best sizing possibilities, interference characteristics and cost-effectiveness with commercially readily available low-cost components for circuit design and regulation of the balancing system.

Figure 3:
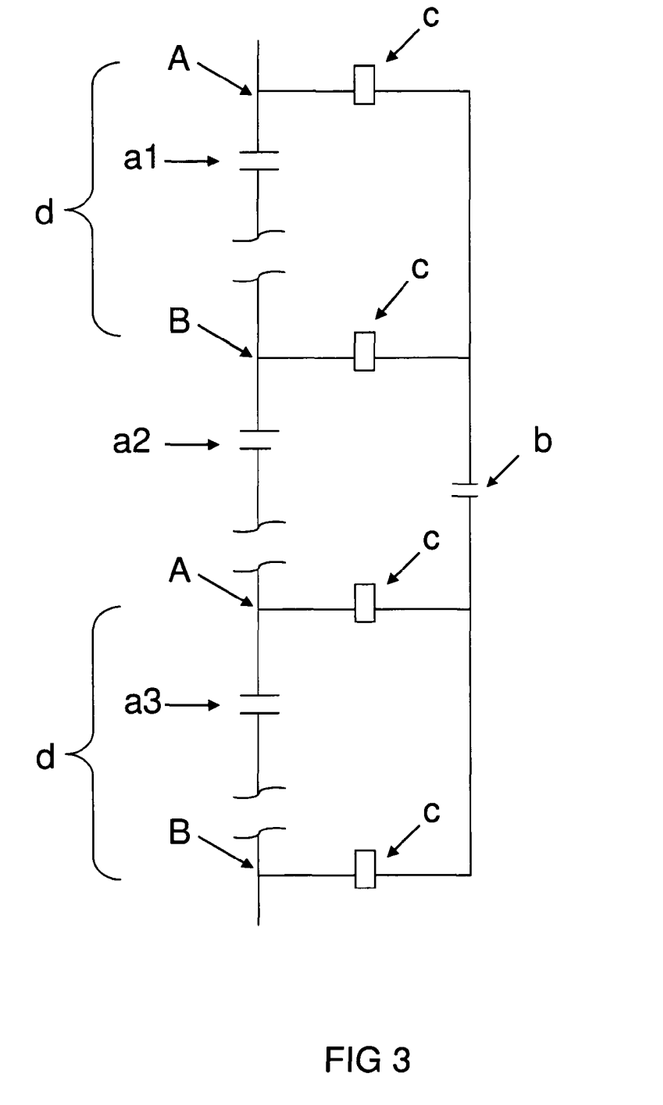
FIG. 3 illustrates an embodiment of a system in accordance with the present invention.

As a first embodiment of the present invention and as illustrated in FIG. 3, a system for balancing a series connection of energy storage devices is provided comprising:

a) an intermediate storage element (b) coupled between a pair of sections (d) of one or a number of adjacent energy storage devices (a1, a2, a3) of a series connection of energy storage devices, said sections each having a more positive terminal (A) at one end and a more negative terminal (B) at its other end;

b) and a switching means (c) switching sequentially between coupling terminals (A) to each other via said intermediate storage element and coupling terminals (B) to each other via said intermediate storage element;

characterized in that said sections are non-adjacent.

In the context of the present invention, terminal (A) and terminal (B) are to be understood as respectively the more positive terminal at one end and the more negative terminal at the other end of each section of one or a number of adjacent energy storage devices.

By using an intermediate storage element that is coupled between a pair of non-adjacent sections and a switching means switching sequentially between coupling terminals (A) to each other via said intermediate storage element and coupling terminals (B) to each other via said intermediate storage element, only a limited number of components are required per energy storage device, while balancing groups of energy storage devices, or individual energy storage devices, is possible over the complete series connection or part of it. The switching means switches alternatingly, placing the intermediate storage element subsequently in parallel to the series connection of (a1) and (a2), and to the series connection of (a2) and (a3). Therefore, in steady state, Va1+Va2=Va2+Va3 and thus Va1=Va3. During the iterative process of charge equalization, the voltage (Va2) of storage device (a2) remains unaffected, while the voltage (Va1) of storage device (a1) becomes equal to the voltage (Va3) of storage device (a3)

Another advantage is that such system performs with improved efficiency and requires less time to achieve balancing, even upon extending the series connection to large numbers of energy storage devices or in case of heavy-duty applications requiring repeated energy delivery and storage in rapid succession.

As a balancing system and method according to the invention is able to convey electrical energy between non-adjacent energy storage devices or groups of non-adjacent energy storage devices, and as the speed of energy charge transfer is proportional to the electric potential difference between those energy storage devices or groups, the use of such system results in a generally faster charge redistribution in the series connection of energy storage devices than can be attained with systems allowing only charge to be transferred between adjacent energy storage devices or groups of energy storage devices.

Further, it is also an advantage that a system in accordance with the present invention allows a simplified structure while automatically controlled balancing which can be activated and deactivated at any time is still possible.

Another advantage of such system is that manufacturing cost and complexity is minimal while easily scalable to large numbers of energy storage devices and different types of energy storage devices.

In the context of the present invention, an energy storage device may be any device adapted to store electrical charge, for example electric double-layer capacitors (EDLCs or so-called ultracapacitors or supercaps), lithium capacitors, electrochemical battery devices and battery packs, and lithium battery devices like lithium-polymer and lithium-ion battery devices.

In an embodiment in accordance with the present invention, said non-adjacent sections of a one or a number of adjacent energy storage devices may comprise one or an equal number of nominally equally sized energy storage devices.

In the context of the present invention nominally equally sized means that an acceptable deviation between the characteristics of the energy storage devices may be allowed.

In another embodiment according to the present invention, a system for balancing a series connection of energy storage devices may be provided comprising a plurality of a pair of non-adjacent sections of one or a number of adjacent energy storage devices and a plurality of respective intermediate storage elements.

Figure 4:
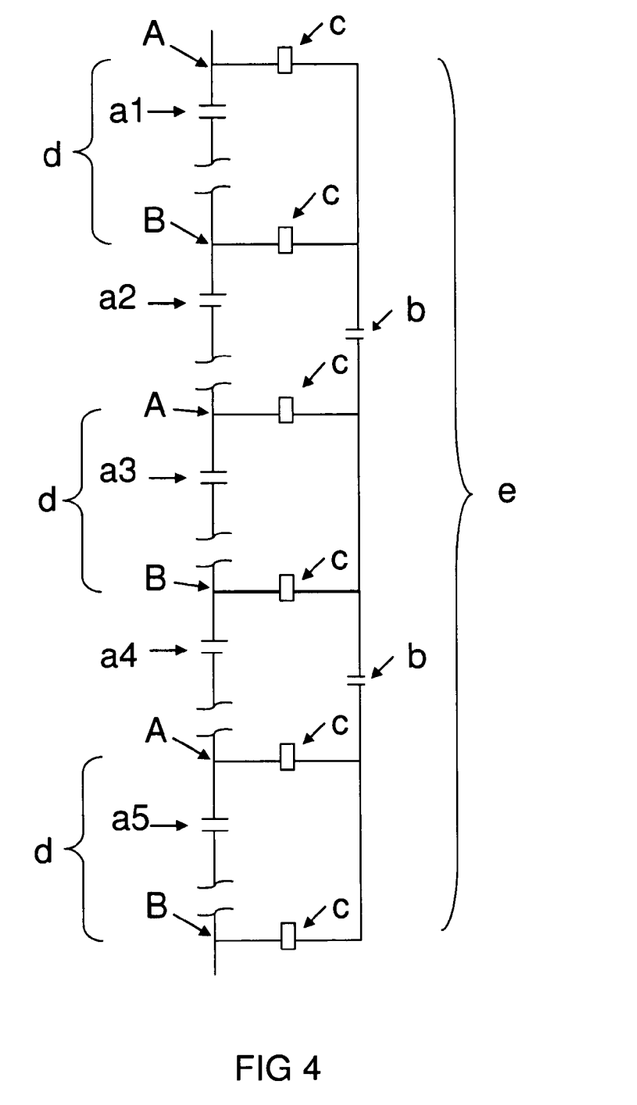
FIG. 4 illustrates another embodiment of a system in accordance with the present invention.

In a further embodiment in accordance with the present invention and as illustrated in FIG. 4, the plurality of respective intermediate storage elements may constitute one or a plurality of serial strings (e). In particular by assembling such strings using bus systems, the manufacturing of the strings and consequently of the complete system may be significantly simplified.

In a particular embodiment in accordance with the invention, two or more pairs of non-adjacent sections of a one or a number of adjacent energy storage devices may comprise overlapping energy storage devices.

In another particular embodiment of the present invention, the switching means may concurrently couple all terminals (A) and concurrently couple all terminals (B) with a number of intermediate storage elements equal to the number of respective coupled terminals minus one.

In the context of the present invention, the intermediate storage element may be any electrical component adapted to intermediately store electrical charge between being coupled to terminals (A) and being coupled to terminals (B), for example capacitors, inductors and transformers.

In contradiction to using charge shunting with dissipative elements such as resistors, using charge shuttling with energy storage elements such as capacitors has the advantage that balancing can be executed during all possible operation modes of the series connecting of energy storage devices, i.e. not only while charging but also while discharging or in idle mode operation.

In a preferred embodiment in accordance with the present invention, the intermediate storage element may be a capacitor. By using commercially available and technically mature capacitors the efficiency and reliability of the balancing system may be highly improved due to efficient charge transportation.

The capacitor used as intermediate storage element may have any capacitance, but preferably between 1 nanofarad and 1 millifarad, more preferably between 10 nanofarad and 100 microfarad, and most preferably around 10 microfarad.

The applied capacitors may be low-cost components defined for low voltage, usually in the order of maximum energy storage device voltages.

The switching means may comprise any electrical component adapted to obtain sequential coupling of the intermediate storage element to terminals (A) and to terminals (B).

The switching means may comprise a Field Effect Transistor (FET) to couple each energy storage device via terminal (A) to an intermediate storage device and a FET to couple each energy storage device via terminal (B) to an intermediate storage device.

In an alternative embodiment the above FETs may be replaced by a combination of a diode and a FET.

In a particular embodiment according to the present invention the switching means may comprise an alternating configuration of p-channel Metal Oxide Silicon Field Effect Transistors (MOSFETs) and n-channel MOSFETs.

In such alternating configuration of p-channel MOSFETs and n-channel MOSFETs, the positive and negative electrodes of the intermediate storage element are connected to the drain electrodes of two p-channel MOSFETs, their source electrodes being connected to the terminals (A) of the respective non-adjacent sections of one or a group of energy storage devices, and the positive and negative electrodes of the intermediate storage device are connected to the drain electrodes of two n-channel MOSFETs, their source electrodes being connected to the terminals (B) of the respective sections. The electric potentials of the terminals (A) are generally higher than the potentials of the respective terminals (B). The gate electrodes of the MOSFETs are connected using a resistance to their respective source terminals (A) and capacitively coupled to a control signal source. The gate terminal itself may function as a control signal source for other MOSFETs as well.

In an alternative alternating configuration of p-channel MOSFETs and n-channel MOSFETs, the positive and negative electrodes of the intermediate storage element are connected to the source electrodes of two n-channel MOSFETs, their drain electrodes being connected to the terminals (A) of the respective non-adjacent sections of one or a group of energy storage devices, and the positive and negative electrodes of the intermediate storage device are connected to the source electrodes of two p-channel MOSFETs, their drain electrodes being connected to the terminals (B) of the respective sections. The electric potentials of the terminals (A) are generally higher than the potentials of the respective terminals (B). The gate electrodes of the MOSFETs are connected using a resistance to their respective source terminals and are capacitively coupled to a control signal source. The gate terminal itself may function as a control signal source for other MOSFETs as well.

Other alternative alternating configurations of p-channel MOSFETs and n-channel MOSFETs can be derived from a combination of either of the two embodiments described above and may result in a reduced component count, by trivial omission of extraneous FETs.

The switching means may also comprise a multiplexer system.

A system in accordance with the present invention may comprise a clock generating a control signal, or a plurality of control signals in case of a plurality of strings, for controlling the switching means. The balancing operation may be fully regulated by modifying the waveform, phase, frequency, duty cycle, amplitude, and/or slew rate of the control signal(s) and can be activated and deactivated at any time.

A system in accordance with the present invention with a plurality of strings of intermediate energy storage devices and corresponding switching means may use either one single or multiple independent control signals for carefully controlling and achieving efficient energy transfer without unwanted effects Individual energy storage devices and/or groups of energy storage devices may be brought towards a desired charge or energy levels by introducing additional or external energy source(s) allowing balancing over a larger dynamic range of the individual energy storage device voltages.

Additionally, the present invention provides an assembly comprising a series connection of energy storage devices and balancing system in accordance with the embodiments as described above.

Further, in an embodiment according to the present invention, also a method for balancing a series connection of energy storage devices is provided, comprising the steps of:

a. providing a series connection of energy storage devices, b. selecting from said series connection a pair of sections (d) of one or a number of adjacent energy storage devices (a1, a2, a3), said sections to be balanced to each other and each having a more positive terminal (A) at one end and a more negative terminal (B) at its other end, c. coupling the terminals (A) of said pair of sections via an intermediate storage element (b), d. decoupling the terminals (A) and coupling the terminals (B) of said pair of sections via said intermediate storage element, e. sequentially repeating step c and d, characterized in that said sections are non-adjacent.

For example, one seeks to balance energy storage device (a1) with energy storage device (a3):

first select a first section consisting of energy storage device (a1) and a second section consisting of energy storage device (a3), both sections are separated by energy storage device (a2).

couple terminal (A) of energy storage device (a1) to terminal (A) of energy storage device (a3) via an intermediate storage element, which results in that the intermediate storage element is coupled in parallel over energy storage device (a1) and energy storage device (a2)

decouple terminals (A) and couple terminal (B) of energy storage device (a1) to terminal (B) of energy storage device (a3) via the intermediate storage element, which results in that the intermediate storage element is then coupled in parallel over energy storage device (a2) and energy storage device (a3).

For example, one seeks to balance energy storage device (a1) with energy storage device (a4):

first select a first section consisting of energy storage device (a1) and a second section consisting of energy storage device (a4), both sections are separated by energy storage devices (a2) and (a3).

couple terminal (A) of energy storage device (a1) to terminal (A) of energy storage device (a4) via an intermediate storage element, which results in that the intermediate storage element is coupled in parallel over energy storage device (a1), (a2), and (a3)

decouple terminals (A) and couple terminal (B) of energy storage device (a1) to terminal (B) of energy storage device (a4) via the intermediate storage element, which results in that the intermediate storage element is then coupled in parallel over energy storage device (a2), (a3), and (a4).

For example, one seeks to balance a group of energy storage devices (a1) and (a2) with a group of energy storage devices (a4) and (a5):

first select a first section consisting of energy storage devices (a1) and (a2), and a second section consisting of energy storage devices (a4) and (a5), both sections are separated by energy storage device (a3).

couple terminal (A) of the section consisting of energy storage devices (a1) and (a2) to terminal (A) of the section consisting of energy storage devices (a4) and (a5) via an intermediate storage element, which results in that the intermediate storage element is coupled in parallel over energy storage device (a1), (a2), and (a3).

decouple terminals (A) and couple terminal (B) of the section consisting of energy storage devices (a1) and (a2) to terminal (B) of the section consisting of energy storage devices (a4) and (a5) via the intermediate storage element, which results in that the intermediate storage element is then coupled in parallel over energy storage device (a3), (a4), and (a5).

A first advantage of such method is that balancing becomes less time consuming due to improved efficiency of charge transfer through the series section, particularly upon extending the series connection to large numbers of energy storage devices.

Further, such method only requires a simplified balancing system structure, while automatically controlled balancing which can be activated and deactivated at any time is still possible.

Another advantage of a method in accordance with the present invention is that large numbers of energy storage devices in a serial connection may be balanced concurrently.

In a method in accordance with the present invention a plurality of pairs of non-adjacent sections of one or a number of adjacent energy storage devices may be selected and the terminals of each pair may be coupled via respective intermediate storage elements, said respective intermediate storage elements constituting one or multiple serial strings.

In a further method in accordance with the present invention the step of selecting may be performed such that two or more pairs comprise overlapping energy storage devices.

A preferred method for balancing a series connection of energy storage devices according to the present invention is provided, wherein each non-adjacent section of one or a number of adjacent energy storage devices may be selected such that it consists of one energy storage device, wherein said respective intermediate storage elements may constitute three serial strings, wherein pairs of said sections corresponding to the first and second of said serial strings may not comprise overlapping storage devices, and wherein at least one pair corresponding to the third of said serial strings may comprise a storage device overlapping with a storage device of a pair corresponding to the first string, and a storage device overlapping with a storage device of a pair corresponding to the second string. By selecting a first energy storage device which belongs to a pair of sections balanced by an intermediate storage element of the first serial string, and a second energy storage device which belongs to a pair of sections balanced by an intermediate storage element of the second serial strings, and then sequentially coupling terminals (A) and terminals (B) of these energy storage devices via an intermediate storage element belonging to a third serial string, the energy storage devices balanced to each other via the first serial string are balanced to the energy storage devices balanced to each other via the third serial string.

Figure 5:
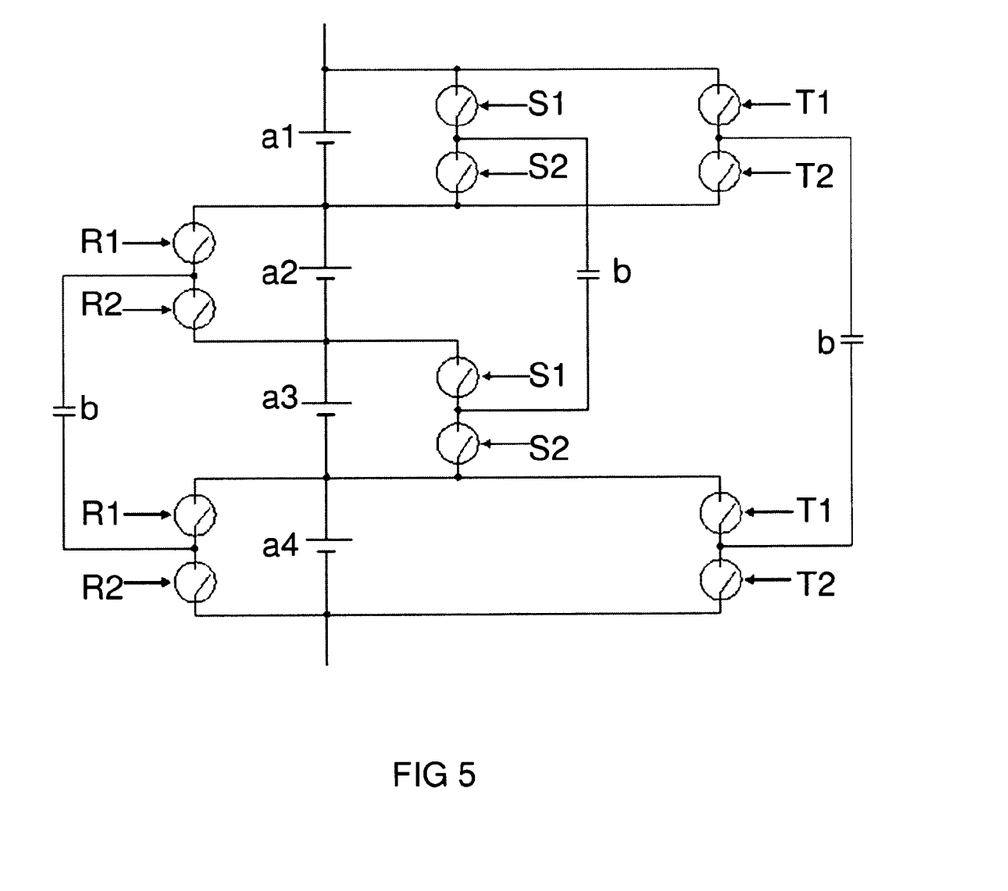
FIG. 5 illustrates schematically a preferred embodiment of a system in accordance with the present invention.

A balancing system in accordance with the present invention and adapted to perform the above method is illustrated schematically in FIG. 5, wherein four electric energy storage elements (a1, a2, a3, a4) are equalized using three charge redistribution stages. These three stages are controlled, respectively by signals (R1.2), (S1.2) and (T1.2), which do not need to have a relationship between each other and can be configured independently to ensure efficient energy transfer and balancing without unwanted effects. The stages based on the R, S and T signals yield Va2=Va4, Va1=Va3 and Va1=Va4 respectively. Such system is designed for balancing a series connection of energy storage devices at the individual energy storage device level, wherein each section consists of one energy storage device, wherein said respective intermediate storage elements constitute three serial strings, wherein pairs corresponding to the first and second of said serial strings do not comprise overlapping storage devices, and wherein at least one pair corresponding to the third of said serial strings comprise a storage device overlapping with a storage device of a pair corresponding to the first string, and a storage device overlapping with a storage device of a pair corresponding to the second string.

Figure 6:
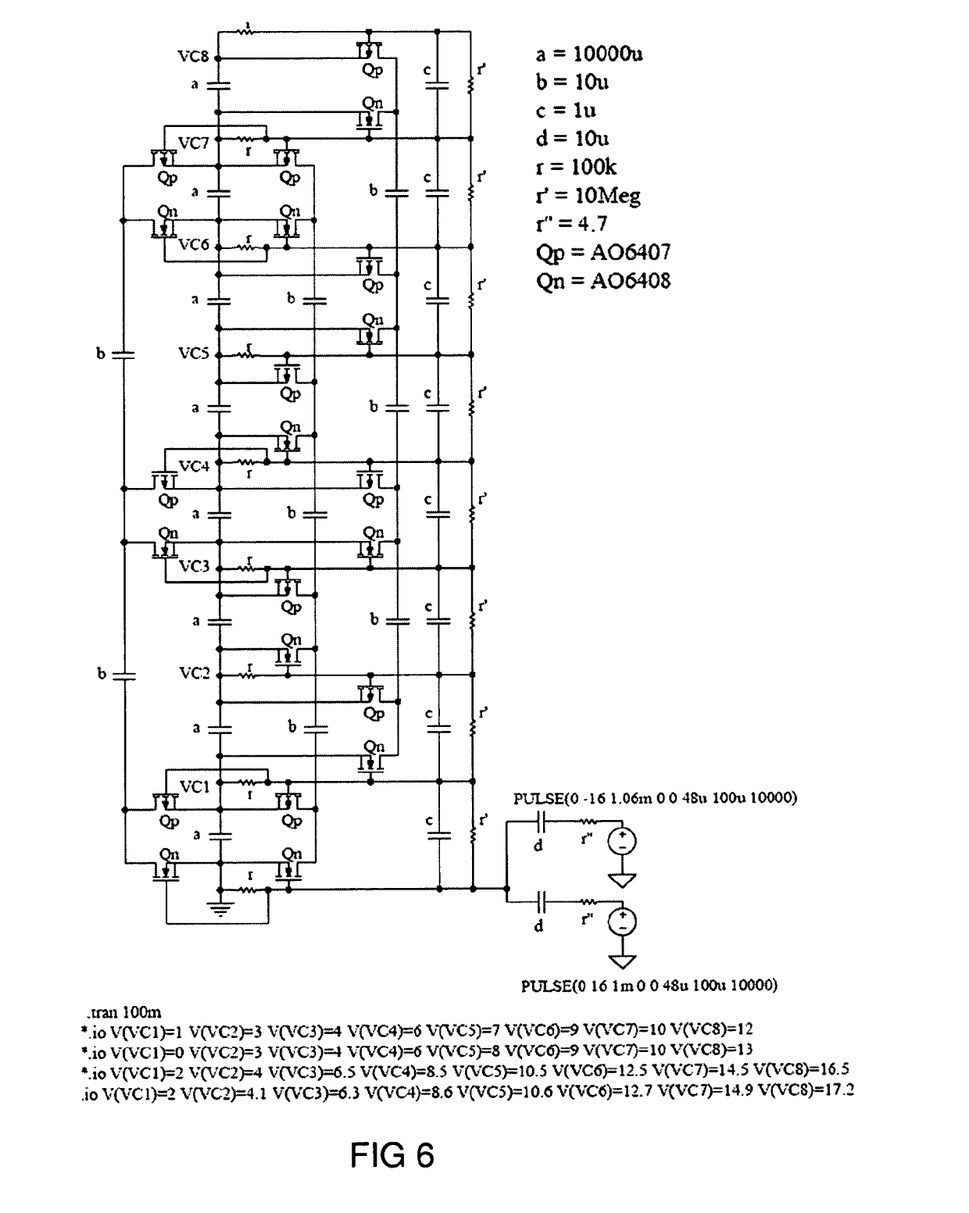
FIG. 6 illustrates a preferred embodiment of a system in accordance with the present invention in more detail.

A detailed example of a balancing system in accordance with the present invention and adapted to perform the above method is illustrated in FIG. 6.

A method in accordance with the present invention may be used for balancing a series connection of electric double-layer capacitors, lithium capacitors, electrochemical battery devices and battery packs, and lithium battery devices like lithium-polymer and lithium-ion battery devices.

The invention claimed is:

1. A system for balancing a series connection of energy storage devices comprising:
   an intermediate storage element coupled between a pair of non-adjacent sections of one or a number of adjacent energy storage devices of a series connection of energy storage devices, said non-adjacent sections each having a more positive terminal (A) at one end and a more negative terminal (B) at its other end; and
   a switching means for switching sequentially between coupling more positive terminals (A) to each other via said intermediate storage element and coupling more negative terminals (B) to each other via said intermediate storage element;
   wherein the switching means decouples more positive terminals (A) of the pair of non-adjacent sections upon coupling more negative terminals (B) of the pair of non-adjacent sections, thereby sequentially coupling the intermediate storage element in parallel over a section including one of said pair of non-adjacent sections and the energy storage devices separating said non-adjacent sections, and over a section including the other one of said pair of non-adjacent sections and the energy storage devices separating said non-adjacent sections.

2. A system for balancing a series connection of energy storage devices according to claim 1, wherein said non-adjacent sections comprise one or an equal number of nominally equally sized energy storage devices.

3. A system for balancing a series connection of energy storage devices according to claim 1, comprising a plurality of said pairs and a plurality of respective intermediate storage elements.

4. A system for balancing a series connection of energy storage devices according to claim 3, wherein the plurality of respective intermediate storage elements constitutes one or a plurality of serial strings.

5. A system for balancing a series connection of energy storage devices according to claim 3, wherein two or more pairs comprise overlapping energy storage devices.

6. A system for balancing a series connection of energy storage devices according to claim 3, wherein the switching means concurrently couples all terminals (A) and concurrently couples all terminals (B) with a number of intermediate storage elements equal to the number of respective coupled terminals minus one.

7. A system for balancing a series connection of energy storage devices according to claim 1, wherein said intermediate storage element is a capacitor.

8. A system for balancing a series connection of energy storage devices according to claim 1, wherein the switching means comprises an alternating configuration of p-channel MOSFETs and n-channel MOSFETs.

9. An assembly comprising a series connection of energy storage devices and a system for balancing a series connection of energy storage devices comprising:
   an intermediate storage element coupled between a pair of non-adjacent sections of one or a number of adjacent energy storage devices of a series connection of energy storage devices, said non-adjacent sections each having a more positive terminal (A) at one end and a more negative terminal (B) at its other end; and
   a switching means for switching sequentially between coupling more positive terminals (A) to each other via said intermediate storage element, and coupling more negative terminals (B) to each other via said intermediate storage element;
   wherein the switching means decouples more positive terminals (A) of the pair of non-adjacent sections upon coupling more negative terminals (B) of the pair of non-adjacent sections, thereby sequentially coupling the intermediate storage element in parallel over a section including one of said pair of non-adjacent sections and the energy storage devices separating said non-adjacent sections, and over a section including the other one of said pair of non-adjacent sections and the energy storage devices separating said non-adjacent sections.

10. A method for balancing a series connection of energy storage devices comprising the steps of:
    a. providing a series connection of energy storage devices,
    b. selecting from said series connection a pair of non-adjacent sections of one or a number of adjacent energy storage devices, said non-adjacent sections to be balanced to each other and each having a more positive terminal (A) at one end and a more negative terminal (B) at its other end,
    c. coupling the more positive terminals (A) of said pair of non-adjacent sections via an intermediate storage element,
    d. coupling the more negative terminals (B) of said pair of non-adjacent sections via said intermediate storage element, and
    e. sequentially repeating step c and d,
    wherein said step d comprises decoupling the more positive terminals (A) of the pair of non-adjacent sections, thereby sequentially coupling the intermediate storage element in parallel over a section including one of said pair of non-adjacent sections and the energy storage devices separating said non-adjacent sections, and over a section including the other one of said pair of non-adjacent sections and the energy storage devices separating said non-adjacent sections.

11. A method for balancing a series connection of energy storage devices according to claim 10, said non-adjacent sections comprise one or an equal number of nominally equally sized energy storage devices.

12. A method for balancing a series connection of energy storage devices according to claim 10, wherein a plurality of said pairs is selected, wherein the terminals of each pair are coupled via respective intermediate storage elements, said respective intermediate storage elements constituting one or multiple serial strings.

13. A method for balancing a series connection of energy storage devices according to claim 12, wherein the switching means corresponding to multiple serial strings are controlled by either one single or multiple independent control signals.

14. A method for balancing a series connection of energy storage devices according to claim 12, wherein the step of selecting is performed such that two or more pairs comprise overlapping energy storage devices.

15. A method for balancing a series connection of energy storage devices according to claim 14, wherein each section consists of one energy storage device, wherein said respective intermediate storage elements constitute three serial strings, wherein pairs corresponding to a first and second of said serial strings do not comprise overlapping storage devices, and wherein at least one pair corresponding to a third of said serial strings comprise a storage device overlapping with a storage device of a pair corresponding to the first string, and a storage device overlapping with a storage device of a pair corresponding to the second string.

16. A method for balancing a series connection of energy storage devices according to claim 15, wherein the switching means corresponding to each of the three serial strings are controlled by respective control signals (R1.2), (S1.2) and (T1.2).

* * * * *